US011194176B2

(12) United States Patent
Miller

(10) Patent No.: US 11,194,176 B2
(45) Date of Patent: Dec. 7, 2021

(54) THROUGH-BODY OCULAR COMMUNICATION DEVICES, NETWORKS, AND METHODS OF USE

(71) Applicant: TECTUS CORPORATION, Saratoga, CA (US)

(72) Inventor: Gregory David Miller, Saratoga, CA (US)

(73) Assignee: TECTUS CORPORATION, Saratoga, CA (US)

( * ) Notice: Subject to any disclaimer, the term of this patent is extended or adjusted under 35 U.S.C. 154(b) by 263 days.

(21) Appl. No.: 16/523,996

(22) Filed: Jul. 26, 2019

(65) Prior Publication Data
US 2021/0026158 A1    Jan. 28, 2021

(51) Int. Cl.
G02C 7/04       (2006.01)
G02B 1/04       (2006.01)
G02B 27/01      (2006.01)
G06F 1/16       (2006.01)
H04B 5/00       (2006.01)
H04B 13/00      (2006.01)
H04B 1/3827     (2015.01)

(52) U.S. Cl.
CPC .............. *G02C 7/04* (2013.01); *G02B 1/043* (2013.01); *G02B 27/0101* (2013.01); *G06F 1/163* (2013.01); *H04B 1/385* (2013.01); *H04B 5/0012* (2013.01); *H04B 5/0037* (2013.01); *H04B 13/005* (2013.01)

(58) Field of Classification Search
CPC ...................................................... G02C 7/04
See application file for complete search history.

(56) References Cited

U.S. PATENT DOCUMENTS

| 9,826,561 | B2 | 11/2017 | Bolin |
| 10,288,909 | B1 | 5/2019 | Youssef |
| 2006/0224215 | A1 | 10/2006 | Pattern |
| 2007/0188710 | A1* | 8/2007 | Hetling .................. A61B 5/398 351/221 |

(Continued)

FOREIGN PATENT DOCUMENTS

| EP | 3078138 A1 | 10/2016 |
| WO | 2014043614 A1 | 3/2014 |

(Continued)

OTHER PUBLICATIONS

Das, et al., "Enabling Covert Body Area Network using Electro-Quasistatic Human Body Communication", Scientific Reports, (2019) 9:4160.

(Continued)

*Primary Examiner* — Hsinchun Liao

(57) ABSTRACT

Ocular devices worn on the eye and through-body communication networks for communicating with an ocular device and other devices interconnected to the through-body communication network are disclosed. Devices and networks for using the body to communication between an ocular device and an on-body and off-body communication networks are disclosed. An ocular device includes electrodes configured to be electrically coupled to the body through tear fluid of the eye when worn on the eye of a user. Electrodes interconnected to the body establish communication with on-body network devices and off-body network devices.

16 Claims, 15 Drawing Sheets

(56) References Cited

U.S. PATENT DOCUMENTS

| | | | |
|---|---|---|---|
| 2007/0239229 A1* | 10/2007 | Masoud | A61B 5/0024 607/60 |
| 2010/0318420 A1 | 12/2010 | Park | |
| 2011/0019717 A1 | 1/2011 | Lim | |
| 2016/0247480 A1 | 8/2016 | Li | |
| 2017/0173262 A1 | 6/2017 | Veltz | |
| 2018/0149884 A1 | 5/2018 | Miller | |
| 2018/0375703 A1* | 12/2018 | Kellogg | H04L 5/0007 |
| 2019/0273396 A1 | 9/2019 | Shahmohammadi | |

FOREIGN PATENT DOCUMENTS

| | | |
|---|---|---|
| WO | 2017058402 A1 | 4/2017 |
| WO | 2017223387 A1 | 12/2017 |

OTHER PUBLICATIONS

Fish, et al., "Conduction of Electrical Current to and Through the Human Body: A Review", Open Access Journal of Plastic Surgery, vol. 9, p. 408-421, 2009.

Hachisuka, et al., "Development and Performance Analysis of an Intra-Body Communication Device", Transducers '03, The 12th International Conference on Solid State Sensors, Actuators and Microsystems, Boston, Jun. 8-12, 2003, p. 1722-1725.

Lee, et al., "A 60Mb/s Wideband BCC Transceiver with 150pJ/b RX and 31pJ/b TX for Emerging Wearable Applications", ISSCC 2014 / Session 30 / Technologies for Next-Generation Systems / 30.7, 2014 IEEE International Solid-State Circuits Conference, p. 498-500.

Maity, et al., "Wearable Health Monitoring Using Capacitive Voltage-Mode Human Body Communication", 2017 39th Annual International Conference of the IEEE Engineering in Medicine and Biology Society (EMBC), 2017, pp. 1-4, doi: 10.1109/EMBC.2017.8036748.

Song, et al., "A 2Mb/s Wideband Pulse Transceiver with Direct-Coupled Interface for Human Body Communications", ISSCC 2006 / Session 30 / Silicon for Biology / 30.4, 2006 IEEE International Solid-State Circuits Conference, p. 558-600.

Zhao, et al., "A Review on Human Body Communication: Signal Propagation Model, Communication Performance, and Experimental Issues", Wireless Communications and Mobile Computing, vol. 2017, Article ID 5842310, 15 pages, https://doi.org/10.1155/2017/5842310, 2017.

Zhu, et al., "High Speed Intra-Body Communication for Personal Health Care", 31st Annual International Conference of the IEEE EMBS, p. 709-712, Minneapolis, Minnesota, USA, Sep. 2-6, 2009.

Zimmerman, "Personal Area Networks (PAN): Near-Field Intra-Body Communication", Massachusetts Institute of Technology, Master's Thesis, 1995.

International Search Report and Written Opinion for App. No. PCT/US2020/043467, dated Oct. 20, 2020, 14 pages.

Chu et al., "Soft contact lens biosensor for in situ monitoring of tear glucose as non-invasive blood sugar assessment", Talanta, Elsevier, Amsterdam, NL, vol. 83, No. 3, Jan. 15, 2011 (Jan. 15, 2011), pp. 960-965, XP027555790, ISSN: 0039-9140.

Karanam et al., "Body Area Networks", Intl. J. Res. Eng. Tech., vol. 05, Special Issue: 03, SYNERGY-2016, Mar. 2016, p. 5-8.

Maity, et al., "BioPhysical Modeling, Characterization and Optimization of Electro-Quasistatic Human Body Communication", arXiv:1805.05200v1. (11 pages).

Maity, et al., "Characterization and Classification of Human Body Channel as a function of Excitation and Termination Modalities", arXiv:1805.02492. (4 pages).

Movassaghi et al., "Wireless Body Area Networks: A Survey", IEEE Comm. Surv. & Tut., 2013. (29 pages).

Sen, "SocialHBC: Social Networking and Secure Authentication using Interference-Robust Human Body Communication", arXiv:1606.05017, Jun. 16, 2016. (6 pages).

Ullah, et al., "A Review of Wireless Body Area Networks for Medical Applications", arXiv:1001.0831v3 [cs.NI] Aug. 3, 2010. (7 pages).

\* cited by examiner

THROUGH-BODY OCULAR COMMUNICATION DEVICES, NETWORKS, AND METHODS OF USE

FIELD

The disclosure relates to ocular devices and networks for using through-body communication to establish one or more communication channels between an ocular device and on-body and off-body communication networks. An ocular device includes electrodes configured to be electrically coupled to a user's body through tear fluid of the eye. The ocular electrodes interconnect the ocular device to a through-body communication network, which can be interconnected to on-body network devices and/or to off-body network devices. Through-body ocular communication networks can provide high fidelity, high bandwidth, and secure communication between an ocular device and network devices interconnected to a through-body communication network.

BACKGROUND

Ocular devices worn on the user's eye are being developed that are designed to communicate with one or more network devices. The need to communicate at bandwidths in the GHz range is anticipated. Direct transmission to ocular electronic devices at MHz to GHz frequencies over the air can have a high path loss. Wireless communication directly to an ocular device can generally only be established through a line-of-sight channel. Furthermore, wireless communication between an external device and an ocular device is subject to interference with other off-body communication channels and is not inherently secure. Wireless security can be enhanced using suitable protocols; however, this can place an additional burden on the processing that takes place within the ocular device.

BRIEF DESCRIPTION OF THE DRAWINGS

The drawings described herein are for illustration purposes only. The drawings are not intended to limit the scope of the present disclosure.

DETAILED DESCRIPTION

Figure 1:
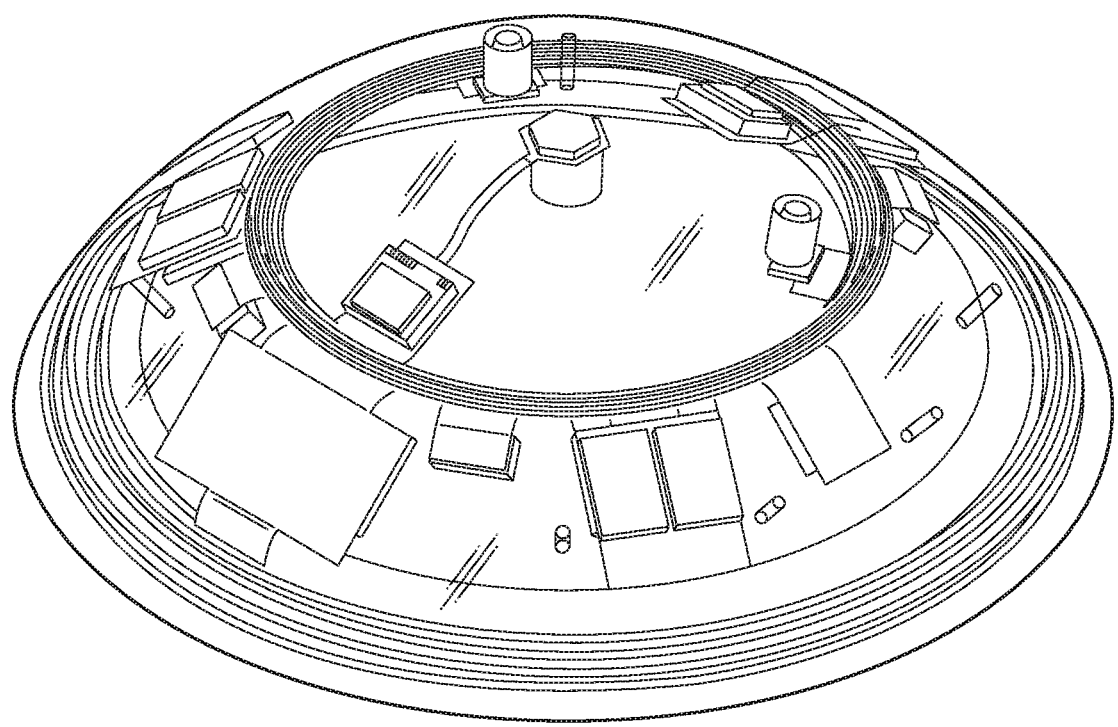
FIG. 1 shows a perspective view of an example of an ocular device provided by the present disclosure.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements, person-to-person variations, and/or day-to-day variations.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

"User" refers to a person wearing an ocular device provided the present disclosure on at least one eye and typically on both eyes. An ocular device is worn on a user's eye and the posterior surface of the ocular device is separated from the anterior surface of the eye by a thin layer of tear fluid.

"Posterior surface" refers to the surface of an ocular device that faces the eye when the ocular device is worn on the eye. The posterior surface is separated from the eye, by a layer of tear fluid.

"Anterior surface" refers to the surface of an ocular device that faces away from the eye when the ocular device is worn on the eye. When worn on the eye of a user, the anterior surface of an ocular device is separated from the eyelids by a thin layer of tear fluid. The layer of tear fluid can have a thickness, for example, less than 10 μm, less than 5 μm, or less than 2 μm.

According to the present invention, ocular devices comprise: a substrate a posterior surface, and an anterior surface; an ocular communication interface incorporated into the substrate; two or more ocular electrodes, wherein, each of the ocular electrodes is electrically interconnected to the ocular communication interface; and each of the ocular electrodes is disposed proximate to the posterior surface and/or to the anterior surface of the ocular device.

According to the present invention, through-body ocular communication networks comprise at least one ocular device according to the present invention worn on the eye of a user.

According to the present invention, methods of communicating with an ocular device worn on an eye of a user, comprise an ocular device according to the present invention transmitting a signal to a through-body communication network; or the ocular device according to the present invention receiving a signal transmitted by a through-body communication network.

According to the present invention, methods of communicating with an ocular device worn on the eye of a user, comprise transmitting a signal to a through-body communication network; sensing a voltage drop induced by the transmitted signal between an electrode pair of an ocular device according to the present invention worn on the eye of a user; and receiving the transmitted signal based on the sensed voltage drop by the ocular communication interface.

According to the present invention, methods of communicating with an ocular device on an eye of a user, comprise: transmitting a signal from the ocular communication interface of an optical device according to the present invention to a through-body communication network; and detecting the signal by a device interconnected to the through-body communication network.

Through-body communication can be used to establish a secure, high-bandwidth, low power communication network. The through-body communication network can be interconnected to an ocular device worn on one or on both of a user's eyes.

Ocular devices can incorporate electronics embedded within a contact lens-like substrate. The embedded electronics can be used, for example, to modify vision, to deliver therapeutic agents, for sensing, to display images onto the retina, and/or to communicate with ocular implants.

An ocular device can be worn in a manner similar to a contact lens. An ocular device can be worn from a few hours to, for example 24 hours, on an eye of a user. The ocular device can be worn and handled similar to a contact lens. When worn, an ocular device rests on the eye and the posterior surface of the ocular device is separated from the anterior surface of the eye by a thin layer of tear fluid. The ocular device can overlie the cornea, the sclera and the limbus of the eye.

Through-body communication can be used to establish one or more communication channels between the electronics within an ocular device and an on-body communication network and/or an off-body communication network. The one or more communication channels can be distinguished, for example, by frequency, time, and/or polarization. The through-body ocular communication network can include a pair or body electrodes electrically interconnecting a user's body to an on-body network device. An ocular device worn on a user's eye includes ocular electrodes electrically coupling the user's body to an ocular communication interface incorporated into the ocular device. The ocular electrodes interconnect to the through-body communication network through tear fluid separating the posterior and/or anterior surfaces of the ocular device from the eye including the cornea, sclera, limbus and/or the eyelids, respectively, of the user's eye. The through-body communication network can be interconnected to one or more on-body network devices and/or can be interconnected to an off-body communication network including one or more off-body network devices. On-body network devices can be interconnected to the through-body communication network by on-body network interfaces. On-body network devices can include devices implanted within a user's body, devices attached to a user's body, devices worn on a user's body, devices incorporated into or retained by clothing worn by a user, and/or devices held by a user. An off-body network can include any other communication device not on or directly associated with the on-body network. Each of the on-body network devices can be configured to transmit signals to and/or receive signals from the through-body communication network. Each of the on-body network devices can be configured to only interconnect to other on-body network devices, and not with an off-body network.

The through-body communication network can include relay devices and amplifiers as appropriate to facilitate high bandwidth communication between devices interconnected to the through-body network.

In an example of a mode of operation, a receiver of a communication interface of an on-body network device receives a signal from an external communication network and sends the signal to electrodes electrically interconnected to a user's body. Current flows through the user's body and a small fraction of the current flows across the eye and is coupled to an ocular communication interface through electrodes disposed on the posterior surface of the ocular device and in electrical contact with the layer of tear fluid between the anterior surface of the eye and the posterior surface of the ocular device. The current flowing across the eye creates a voltage drop between the spaced-apart ocular electrodes of the ocular device and is sensed through the tear layer. The ocular electrodes can be capacitively or galvanically coupled to the tear fluid. The voltage drop across the ocular electrodes is sensed by a receiver of the ocular communication interface and can be amplified and/or filtered within the ocular device to provide a useable signal.

The transmitted signal from an external communication network can be, for example, a video signal and the video signal received by the ocular device can be displayed in the ocular device as a video image. Any suitable video signal and coding scheme can be used.

A through-body ocular communication network can also be used to transmit signals from an ocular device to an on-body communication network and/or to an off-body communication network.

An ocular device provided by the present disclosure is a device that can be worn on a user's eye. An ocular device provided by the present disclosure can incorporate electronics.

The electronics can include a transmitter, a receiver, or a combination thereof. Examples of other electronic elements incorporated into an ocular device provided by the present disclosure can include amplifiers, filters, image projectors, buffers, processors, imagers, memory, antenna, power sources such as batteries, and combinations of any of the foregoing.

An ocular device can be any suitable ocular device that is configured to facilitate the ability of electrodes incorporated within the ocular device to electrically interconnect to a through-body communication network through the tear fluid of the eye.

An ocular device can be worn on a user's eye and typically on both eyes of the user.

An ocular device refers to a device that includes a substrate and electronics and is configured to be worn on the eye of a user. The electronics can be embedded within the substrate, disposed on the posterior surface of the substrate, and/or disposed on the anterior surface of the substrate. The substrate can have the shape of a contact lens typically used to correct vision. For example, the substrate can have the shape of a scleral contact lens. The substrate is configured to be worn on the eye and may or may not be configured to correct vision. The substrate can comprise any suitable material typically used to fabricate a contact lens.

A perspective view of an example of an ocular device provided by the present disclosure is shown in FIG. 1. As shown in FIG. 1, various electronic components are incorporated into the ocular device. FIG. 1 shows a substrate, a retinal projector 102, sensors for tracking eye and head movement 103, various electronic components 104, and power coils 105.

Figure 2:
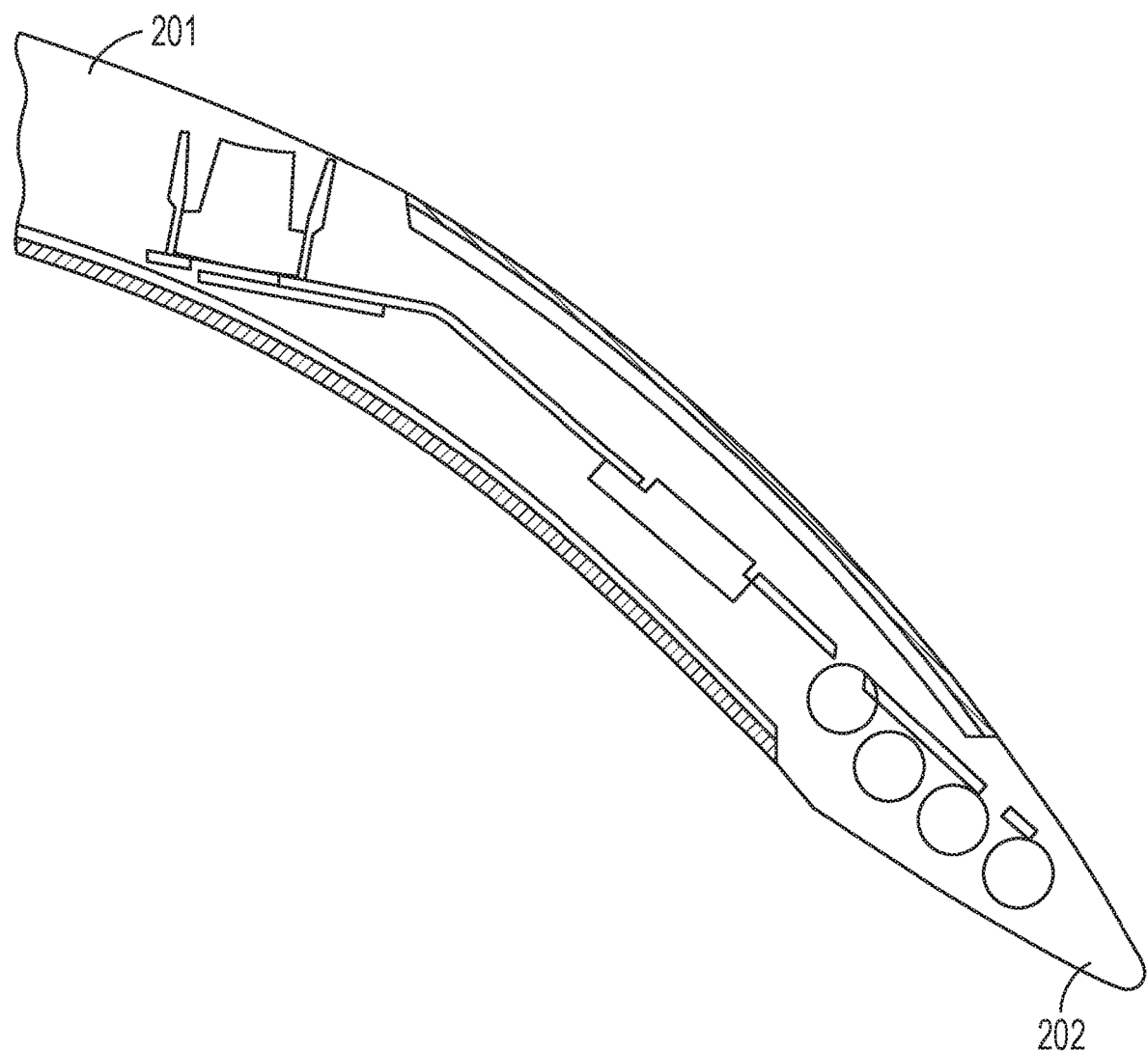
FIG. 2 shows a cross-sectional view of an example of a portion of an ocular device provided by the present disclosure.

FIG. 2 shows a cross-sectional view of an example of a portion of an electronic device provided by the present disclosure. FIG. 2 shows substrate 201, scleral portion 202, electronics 204, and power coils 205.

The substrate of an ocular device can be formed from any suitable ophthalmic material or combination of ophthalmic materials. Suitable ophthalmic materials can exhibit properties that maintain the health of the eye and provide comfort to the user. For example, a suitable ophthalmic material can exhibit an oxygen permeability Dk from 10 to 100. A suitable ophthalmic material can be a rigid gas permeable (RGP) contact lens material such as, for example, fluoro-silicone acrylate, silicone acrylate, fluoro-siloxane acrylate, and siloxane acrylate.

An ocular device may be formed from a soft ophthalmic material, a rigid ophthalmic material or a combination thereof. An ophthalmic device can be formed from a single ophthalmic material or a combination of ophthalmic materials. For example, different portions of an ocular device can be formed from different ophthalmic materials and can be selected to achieve a certain performance attribute within a particular portion of the ocular device. For example, materials toward the peripheral edge of an ocular device can have a lower modulus to improve comfort and to enhance electrical coupling of the ocular device with the sclera and/or eyelids. Other portions of an ocular device can have a higher modulus to provide a support for the integrated ocular electronics.

The ophthalmic materials and the physical design of an ocular device can be selected to provide user comfort during wear and to facilitate the ability of a user to wear the ocular device for an extended period of time. For example, the ocular device can be worn for from 2 hours to 24 hours, from 3 hours to 20 hours, from 4 hours to 16 hours. An ocular device can be configured to be worn on the eye of a user, for example, for at least 2 hours, at least 4 hours, at least 6 hours, at least 8 hours, at least 10 hours, or at least 12 hours.

The electronics can be configured for any suitable purpose such as for modifying vision, delivering therapeutic agents, chemical sensing, position sensing, gaze direction sensing, image projection, or a combination of any of the foregoing.

The electronics can be incorporated into or embedded within the body of the ocular device.

The electronics can include at least one ocular communication interface such as a receiver, a transmitter, a transceiver, or a combination of any of the foregoing.

The ocular communication interface can be configured to transmit and/or receive communication at frequencies, for example, from 100 kHz to 5 GHz. The ocular communication interface can be configured to transmit and/or receive communication at frequencies, for example, greater than 100 kHz, greater than 100 MHz, greater than 500 MHz, greater than 1 GHz, or greater than 5 GHz.

An ocular communication interface of an ocular device can be electrically interconnected to at least two electrodes. The at least two ocular electrodes can form an electrode pair. For example, an ocular device can comprise from 2 to 12 electrodes, from 2 to 10 electrodes, from 2 to 8 electrodes, from 2 to 6 electrodes, or from 2 to 4 electrodes. An ocular device can comprise two electrodes, more than 2 electrodes, more than 4 electrodes, more than 6 electrodes, more than 8 electrodes, or more than 10 electrodes.

The ocular electrodes can be disposed such that the ocular electrodes are electrically interconnected to the ocular communication interface of the ocular device and electrically coupled to the tear fluid of the eye when the ocular device is worn on the eye of a user.

The ocular electrodes can be situated at any suitable radial distance from the geometric center of the ocular device. The electrodes can be situated at a radial distance that does not interfere with a user's vision. Each of the electrodes can be disposed at the same radial distance from the geometric center of the ocular device or can be disposed at different distances from the geometric center of an ocular device. For example, electrodes can be situated in the scleral portion of the ocular device, which can be between 5 mm to 10 mm from the geometric center of the ocular device.

The ocular electrodes can be disposed at a radial distance from the geometric center that corresponds to the limbus of the eye, which represents the interface between the cornea and the sclera. In other configurations, the ocular electrodes can be situated in a region of the posterior surface of the ocular device that overlies the cornea or overlies the sclera when worn on a user's eye.

The ocular electrodes can be configured as electrode pairs, in which each electrode of an electrode pair is situated on an opposite of the ocular device other with respect to the geometric center of the ocular device.

Each ocular electrode can be characterized by an area. For example, an electrode can have an area from 0.05 $mm^2$ to 2 $mm^2$ for galvanic coupling and from 5 $mm^2$ to 20 $mm^2$ for capacitive coupling.

Electrodes can be configured as pins or can be configured as planar electrodes. In the form of a planar electrode, an electrode can be deposited as a thin-film on the substrate such as, for example by printing, evaporation, or sputtering.

An ocular electrode can have any suitable cross-sectional shape such as, for example, round, oval, square, or semicircular. It can be desirable that an ocular electrode have as large a surface area as possible within the physical design constraints of the ocular device.

An ocular electrode surface can be formed from any suitable electrically conductive material, such as any suitable biocompatible electrically conductive material. Examples of suitable biocompatible electrically conductive materials include gold and platinum. An ocular electrode can include a coating of a biocompatible electrically conductive material such as titanium nitride.

When an ocular device is worn on the eye, the ocular electrodes can be capacitively coupled to the tear fluid. The resistance between the ocular electrodes is much higher than the resistance between an ocular electrode and the eye. For example, the distance between ocular electrodes can be about 10,000 μm, and the distance between an ocular electrode and the eye is about 10 μm.

An ocular electrode can be embedded within an ocular device and situated proximate the posterior surface of the ocular device such that the electrode is capacitively coupled to the tear fluid when the ocular device is worn on the eye. For example, for capacitive coupling to the tear fluid, an electrode can be within from 1 μm to 50 μm, such as from 2 μm to 20 μm, or from 3 μm to 10 μm, from the posterior surface of the ocular device. When the ocular device is worn on the eye, the capacitance between the electrode and the tear fluid can be from 1 nF to 100 pF.

A capacitively coupled ocular electrode can be separated from the posterior surface of an ocular device by a thin layer of substrate material. A capacitively coupled electrode can be separated from the posterior surface of an ocular device by a dielectric material such as, for example, aluminum nitride. The dielectric material can be printed, evaporated, or sputtered onto the electrode material to provide a large area electrode having a high capacitance. The use of a suitable dielectric material can cause the ocular electrode to function as a high pass filter.

A capacitively coupled ocular electrode can be configured to be flush with the posterior surface of the ocular device or recessed within a cavity of the ocular device. Using printing, evaporating, or sputtering deposition methods, a capacitively coupled electrode and overlying thin film dielectric can be configured to be flush with the posterior surface of the ocular device. The location of the ocular electrode can be selected so as to not compromise user comfort.

When an ocular device is worn on the eye, the ocular electrodes can be galvanically coupled to the tear fluid.

An ocular electrode can be disposed such that the surface of the electrode physically contacts the tear fluid when an ocular device is worn on a user's eye. In this configuration, the ocular electrode is galvanically coupled to the tear fluid. An ocular electrode can be disposed such that the surface is flush with the posterior surface of the contact lens. In another approach, a posterior surface of an ocular device can include cavities configured to fill with tear fluid when worn on a user's eye. The surface of the ocular electrode can be flush with a wall of the cavity or the ocular electrode can extend into the cavity. The use of cavities to facilitate physical contact between an ocular electrode and tear fluid can ease certain design constraints and improve user comfort.

FIGS. 3A-3D show cross-sectional views of examples of capacitively-coupled and galvanically-coupled electrode configurations.

Figure 3A:
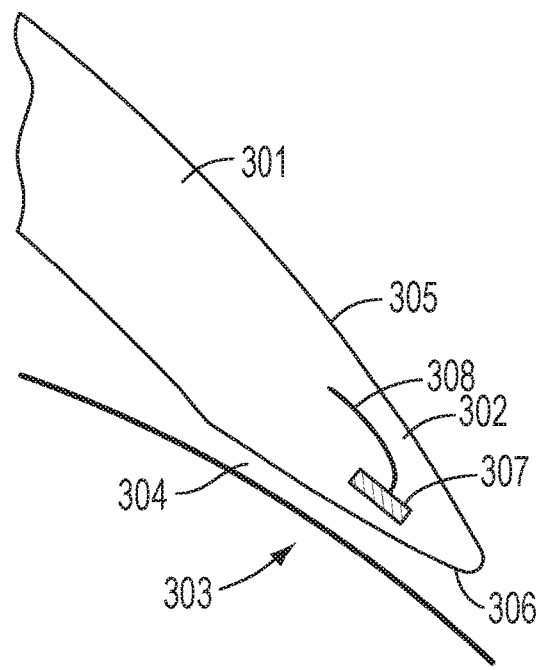
FIGS. 3A-3D show examples of the disposition of capacitively coupled (FIG. 3A) and galvanically coupled (FIGS. 3B-3C) electrodes of an ocular device, and ocular electrodes disposed toward the anterior surface of an ocular device (FIG. 3D) provided by the present disclosure.

FIG. 3A shows an example of capacitively coupled electrode including ocular device 301, scleral portion 302 of ocular device 301 (with electronics omitted), anterior ocular device surface 305, posterior ocular device surface 306, cornea 303, tear fluid 304, ocular electrode 307 embedded within the scleral portion 302 of ocular device 301, and electrical connection 308 electrically interconnecting ocular electrode 307 to an ocular communication interface (not shown). In this configuration, ocular electrode is capacitively coupled to the sclera.

Figure 3B:
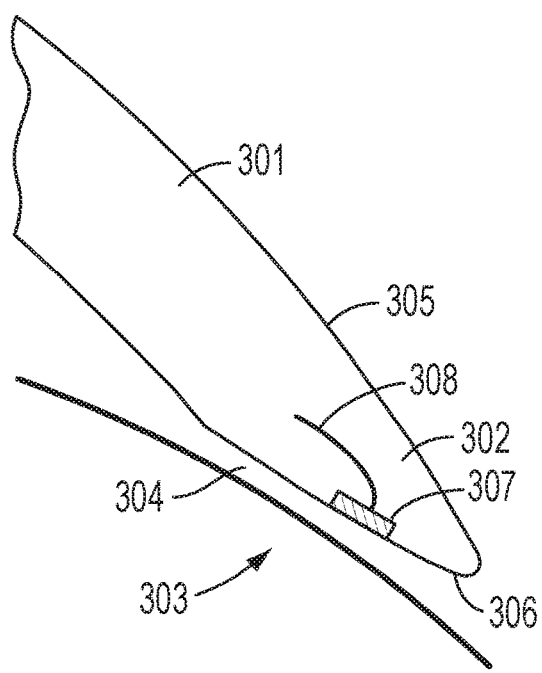

FIG. 3B shows an example of a galvanically coupled electrode configuration including ocular device 301, scleral portion 302, anterior surface 305, posterior surface 306, cornea or sclera 303, tear fluid 304, ocular electrode 307 disposed at the posterior surface 306 of the scleral portion 302 of ocular device 301. In this configuration, ocular electrode is galvanically coupled to the sclera.

Figure 3C:
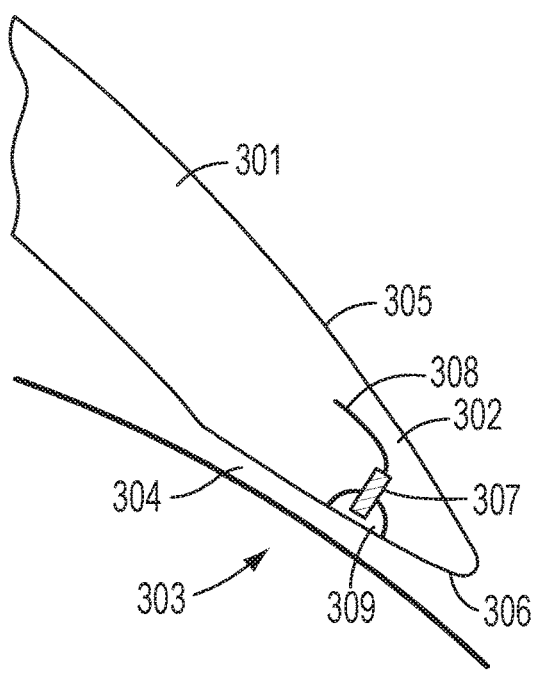

FIG. 3C shows an example of a galvanically coupled electrode configuration in which the electrode is galvanically coupled to tear fluid within a cavity. FIG. 3C includes ocular device 301, scleral portion 302, anterior surface 305, posterior surface 306, cornea or sclera 303, tear fluid 304, ocular electrode 307 extending into cavity 309 in the posterior surface 306 of the scleral portion 302 of ocular device 301. In another configuration, the ocular electrode can be situated on the cavity wall.

In another configuration, the ocular electrodes can be coupled to tear fluid on the anterior surface of a contact lens. The eyelids engage the anterior surface of the eye and are separated from the eye by a thin layer of tear fluid. Ocular electrodes situated on the anterior surface of the ocular device can be used to sense the potential difference generated by current flowing across the eye and through the eyelids.

Figure 3D:
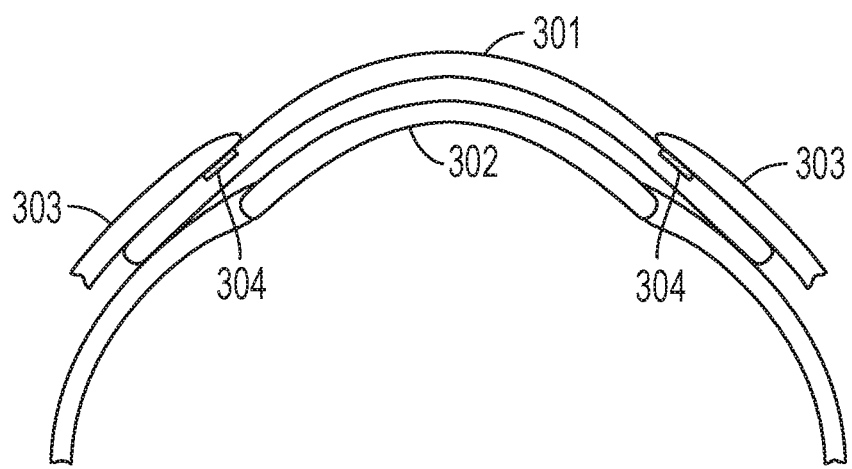

Ocular electrodes located in the peripheral portion of the eye toward or under the eyelids can be used to couple a through-body network to an ocular device. An example is shown in FIG. 3D, which shows a cross-sectional view of ocular device 301, cornea 302, eyelids 303, and capacitively coupled ocular electrodes 304, on the anterior surface of ocular device 301. Eyelids 303 and ocular electrodes 304 are separated by a thin layer of tear fluid. In this configuration, the ocular electrodes can be capacitively coupled or galvanically coupled to the overlying tear fluid.

In another configuration, ocular electrodes can be disposed on both the posterior and anterior surfaces of an ocular device and can be capacitively and/or galvanically coupled to either the eye or to the eyelids through the tear fluid.

In one ocular electrode configuration each ocular device can incorporate a pair of electrodes with each pair of electrodes having a horizontal orientation, where the electrodes are coaligned or horizonal with respect to a user's eyes.

In another ocular electrode configuration both electrode pairs can be oriented vertically with respect to a user's eyes; or the electrode pair of a first ocular device can be aligned with the eyes, and an electrode pair of the second ocular device can be orthogonal to the eyes. The pair of electrodes can be oriented orthogonal to each other to facilitate polarized communication such that independent communication channels can be established for each eye. Polarized communication can also be used to improve signal quality.

Figure 4A:
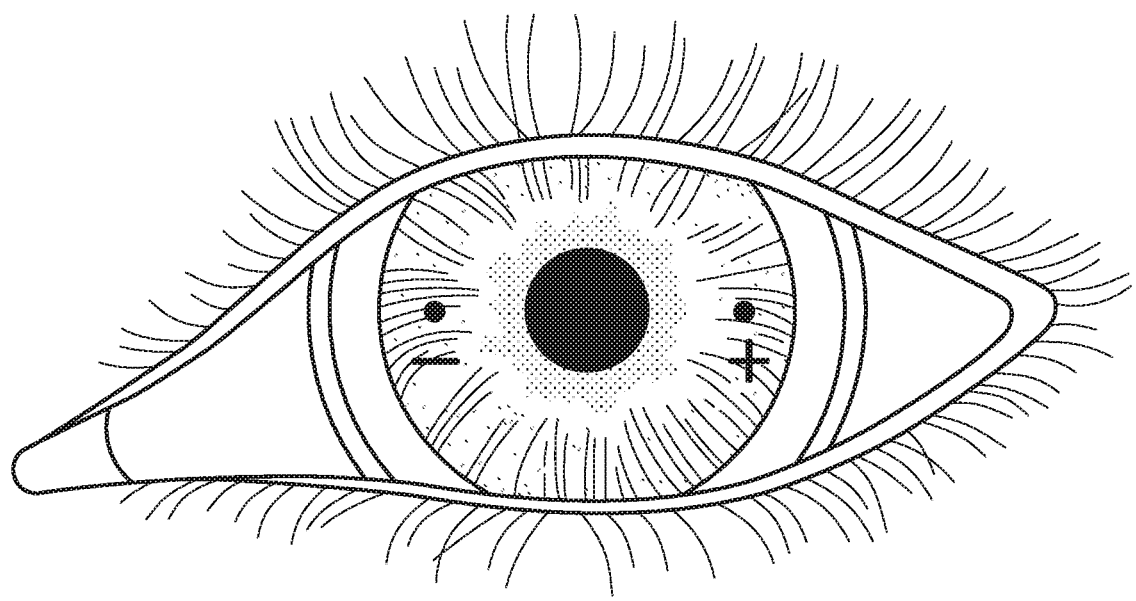
FIGS. 4A and 4B show examples of a horizontally polarized electrode pair and a vertically polarized electrode pair, respectively.
Figure 4B:
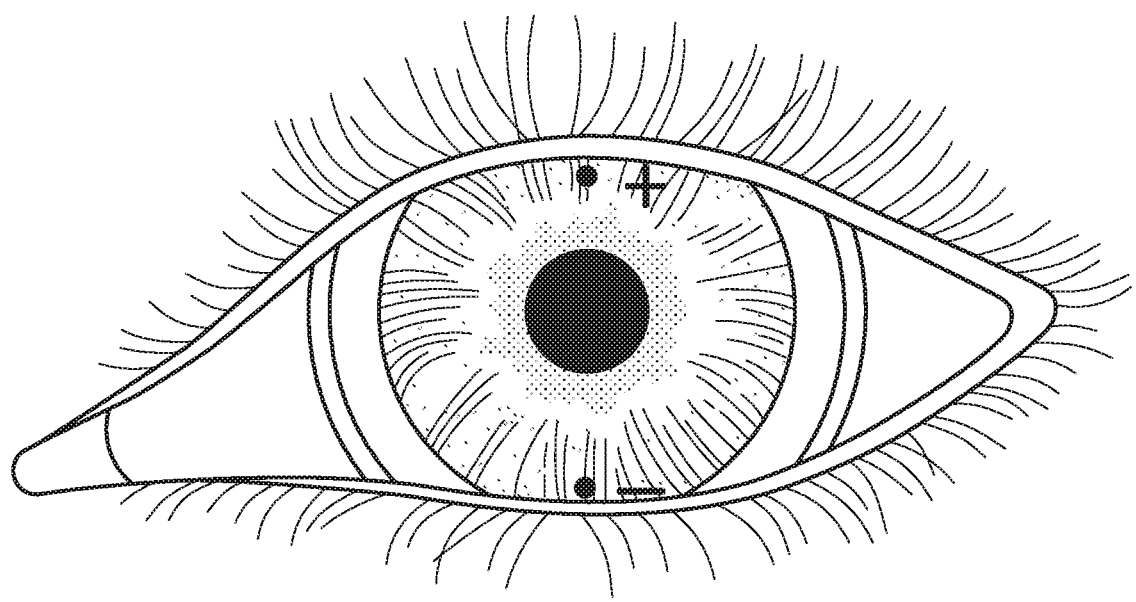

Horizontal and orthogonal/vertical orientations of electrode pairs with respect to an eye are shown in FIG. 4A and FIG. 4B, respectively.

An ocular device can have two pairs of electrodes or more than two pairs of electrodes. For example, an ocular device can have four (4) electrodes placed symmetrically around the geometric center of the ocular device. This configuration can facilitate circular polarized communication.

To enhance communication quality, it is desirable that electrodes of an ocular electrode pair be placed as far apart as possible. An odd number of ocular electrodes can also be used.

Through-body ocular communication networks provided by the present disclosure include, in addition to ocular devices, devices including an on-body network interface with body electrodes and electronics for receiving and/or transmitting signals to and from the body electrodes. The on-body device can interface with an on-body communication network and/or an off-body communication network.

Any suitable body electrodes and body electrode configuration can be used. Suitable body electrodes can establish electrical interconnection with the body through a user's skin. Body electrodes can also be implanted within a user's body. Electrodes can be electrically connected to any part of a user's body. Electrodes can be electrically connected to a user's skin. One body electrode can be electrically connected to a user's skin and another body electrode can be spaced near a user's skin such as within 5 mm, within 4 mm, within 3 mm, within 2 mm, or within 1 mm of a user's skin. For example, both body electrodes can be galvanically coupled to a user's body, or one body electrode can be galvanically coupled to a user's body and another body electrode can be capacitively coupled to a user's body. Body electrodes can be capacitively coupled to a user's body.

It can be desirable that the body electrodes for communicating with an ocular device be placed in proximity to the eyes. In proximity to the eyes generally includes any part of a user's body including the upper torso and above. For example, electrodes can be mounted on a user's forehead, chin, ears, side of the neck, front of the neck, back of the neck, shoulders, chest, upper back, arms, and or wrists.

Body electrodes can be provided as electrode pairs. Body electrodes forming an electrode pair can be disposed on a user's body such that one electrode is nearer to one eye and the second electrode of the electrode pair is near the other eye. For example, a body electrode pair can be situated approximately symmetrically on a user's body. An odd number of electrodes can also be used.

Body electrodes are well known and any suitable body electrode can be used.

Pressure can be applied to a body surface electrode to provide sufficient electrical contact to the skin surface. Pressure can be applied, for example, using adhesive patches. Wrist bands or other such accessories are useful for making electrical contact to the arms and the legs.

In through-body ocular communication networks provided by the present disclosure it can be desirable to situate the body electrodes in proximity to the eyes or at least as near to the eyes as practicable. Accordingly, it can be useful to mount the body electrodes on accessories worn on the neck, head, or ears.

Figure 5A:
FIGS. 5A and 5B show examples of accessories including body electrodes, a through-body network interface, and on-body and/or off-body network communication electronics.
Figure 5B:
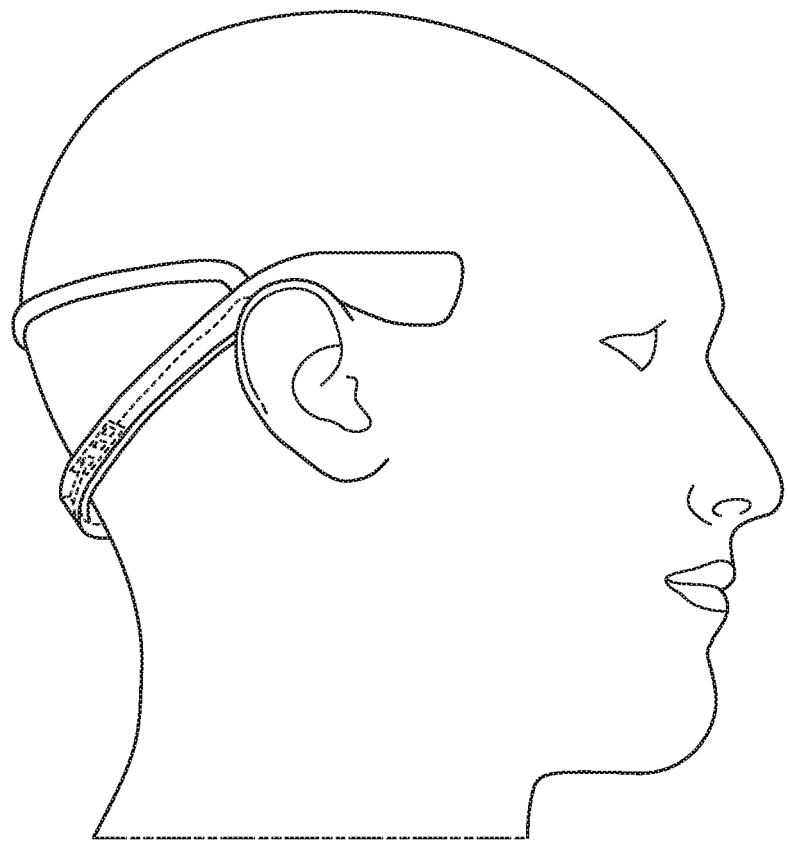

For example, body electrodes can be incorporated into accessories that are worn on the user's head, neck or upper torso such as necklaces, ear rings, head sets, audio devices, and head bands. Examples of suitable accessories are shown in FIG. 5A and in FIG. 5B. FIG. 5A shows a user wearing a necklace incorporating body electrodes and an on-body communication device. FIG. 5B shows a user wearing a headset incorporating body electrodes and an on-body communication device.

Body electrodes can be implanted within a user's body.

Figure 6A:
FIGS. 6A and 6B shows different orientations of ocular electrodes and body electrodes.
Figure 6B:

Examples of the orientation of electrode pairs in ocular devices and of a body electrode pair are shown in FIG. 6A and in FIG. 6B. FIG. 6A shows ocular electrodes aligned with a user's eyes and a body electrode pair situated near the user's shoulders and symmetrical with respect to the user's body. In FIG. 6B, the ocular electrode pairs are in an orthogonal orientation where the orientation of the electrode pair on one eye is orthogonal to the electrode pair on the other eye and one of the ocular electrode pairs is orthogonal to the body electrode pair. In an orthogonal configuration such as shown in FIG. 6B, two communication channels can be employed such that one communication channel communicates with a first ocular device on one of the user's eyes, and another communication channel communicates with a second ocular device on the user's other eye.

Body electrodes can be capacitively coupled to a user's body or can be galvanically coupled to a user's body.

Electrical contact to a user's skin can be enhanced by using an electrically conductive elastomeric material between the electrode and a user's skin. Conductive silicone can be used to improve the electrical contact between a body electrode and a user's skin.

Body electrodes can be situated within a user's ear canal. In this configuration, electrodes can be placed, for example, from 2 mm to 3 mm apart to receive low frequency audio signals with high sensitivity from a through body communication network. Similarly these electrodes can be used to receive low-frequency audio signals encoded as part of an overall through-body communication network protocol. A microphone can be connected to the body electrodes in the user's ear canal to enable either encoded or direct transmission of audio information received by the microphone.

The body electrodes can be interconnected to a receiver, transmitter, or transceiver and power source. These electrical components can be integrated into a wearable device or can be interconnected to a separate device on or in proximity to the user. For example, the body communication interface can be incorporated into a module that can be retained by the users clothing or otherwise worn by the user.

The transmitter and/or receiver can be included on a device external to a user's body.

The communication interface can be configured to receive and/or transmit signals at frequencies, for example, from 100 kHz to 5 GHz. Through-body communication may not require a carrier.

In addition to facilitating communication to an ocular device, the body communication interface can maintain a communication channel with other on-body devices interconnected to the through-body communication network. Examples of devices that can be adapted to interconnect to a through-body communication network can include smart phones, wireless devices such as Bluetooth enabled devices, audio headsets, hearing aids, medical devices, implanted devices, and medical monitoring devices. The body communication interface can also maintain and coordinate communication with off-body devices such as portable computers and desktop computers. The body communication interface can be configured to receive audio signals such as signals from speakers located in a user's ear. A body communication interface can be incorporated into one or more on-body devices. Depending on the device the communication can be via the through-body communication network and/or via a WiFi network.

A through-body ocular communication network provided by the present disclosure can include an ocular device provided by the present disclosure and an on-body network device having body electrodes coupled to a through-communication interface through a user's body. A through-body ocular communication network can include, for example, one ocular device or two ocular devices, that are worn on one eye or on both eyes of a user. In addition to the body electrodes, a communication device can include electronics for receiving and/or transmitting signals from an external communication network.

The ocular devices and ocular communication networks provided by the present disclosure can be used to transmit communication signals to ocular devices, transmit communication signals from ocular devices, or to transmit communication signals to and from the ocular devices, where the ocular devices are worn by a user.

To operate a through-body ocular communication network provided the present disclosure a user can place an ocular device onto each eye and place two more body electrodes interconnected to an on-body interface device onto the skin to provide and through-body ocular communication channel.

Through-body ocular communication networks provided by the present disclosure can be used, for example, to send video data to be displayed by a projector incorporated into the ocular device.

Ocular communication networks can be used to measure eye rotation and/or gaze angle. The transmission amplitude can be related to the orientation of the eye within the eye socket and therefore the transmission amplitude can be used to measure eye orientation with respect to a user's head. The eye position and/or gaze angle can be useful, for example, to control transmissions to and/or from the ocular device. This information can be transmitted from an ocular device to an on-body network device through body electrodes.

Figure 12:
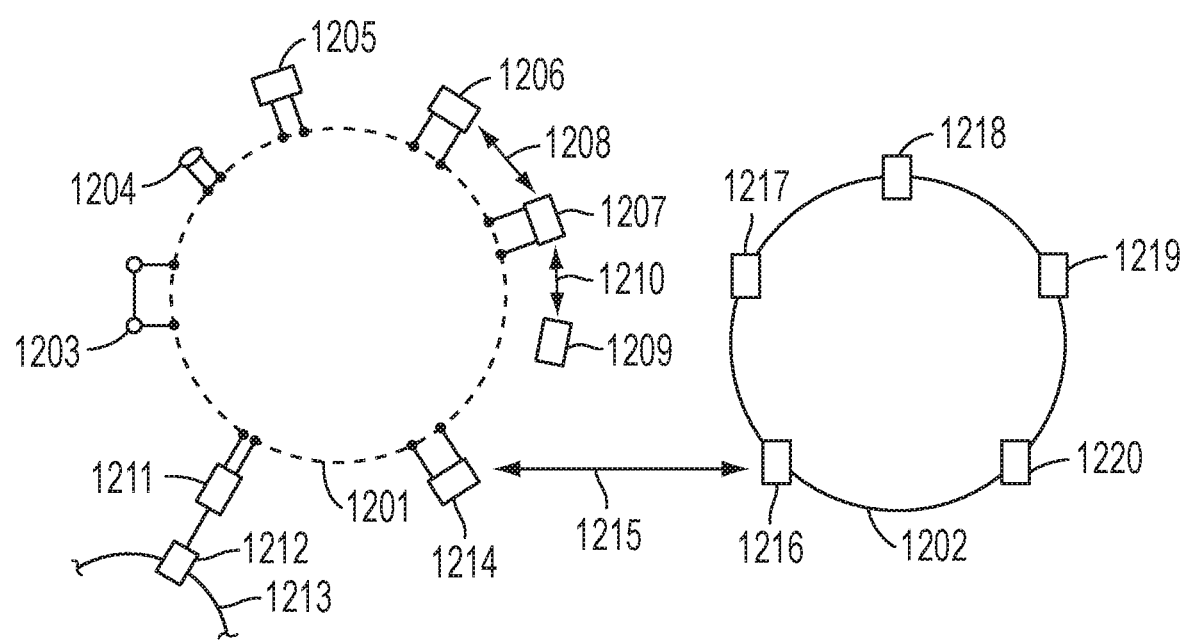
FIG. 12 shows an example of a through-body ocular communication network provided by the present disclosure.

A schematic diagram of an example of an ocular communication network is shown in FIG. 12. The network includes through-body communication network 1201 and off-body communication network 1202. On-body devices can be interconnected to the through-body communication network 1201 through respective on-body electrodes and respective through-body network interfaces (not shown). For example, as shown in FIG. 12, on-body devices 1203-1207, 1211 and 1214 can each be interconnected to the through-body communication network 1201 by its respective on-body electrode pair. On-body devices such as devices 1203-1205 can be interconnected only to the through-body communication network 1201. Other on-body devices such as devices 1206, 1207, 1211, and 1214 can communicate with other on-body devices and/or off-body devices and off-body networks. For example, on-body device 1206 is interconnected to on-body device 1207 through wireless channel 1208. On-body device 1207 can communicate with device 1209, which can be on on-body device or an off-body device, through wireless channel 1210. Device 1209 is not interconnected to any other devices or networks. On-body device 1211 is interconnected to an off-body network 1213 via a physical interconnect to off-body network device 1212. On-body device 1214 can communicate with off-body network 1202 through wireless channel 1215 and off-body network device 1216. Off-body network includes off-body devices 1216-1220. Communication channel 1215 can be encrypted to provide secured communications between through-body communication network 1201 and off-body network 1202. The communication channel between devices 1211 and 1212 can also be secured.

FIG. 12 also shows a single ocular device 1204 and two ocular devices 1203 interconnected to the through-body communication network. In practice, one or the other of ocular device 1204 or 1203 would be employed. For example, a user could wear a single ocular device as represented by ocular device 1204, or a user could wear an ocular device on both eyes as represented by device 1203. One or more of the devices interconnected to the through-body communication network 1201 can communicate with ocular device 1203 and 1204.

For certain applications it can be desirable that all communication be only over the through-body network.

Ocular through-body communication networks provided by the present disclosure can operate a frequencies, for example, from 100 kHz to 5 GHz.

Ocular through-body communication networks provided by the present disclosure can operate a power levels, for example, less than 25 mW.

A 1 μW signal generated by the ocular component can result in a 10 pW signal on the body. This represents an attenuation of 50 dB.

EXAMPLES

Embodiments provided by the present disclosure are further illustrated by reference to the following example, which demonstrates devices, networks, and methods provided by the present disclosure. It will be apparent to those skilled in the art that many modifications, both to materials, and methods, may be practiced without departing from the scope of the disclosure.

A prototype through-body ocular communication network was constructed to demonstrate operation. The ocular through-body communication network included an ocular device worn on one eye of a user and a pair of body electrodes placed on the back of the user's neck.

The ocular device used for the test included a two-layer flexible circuit applied to the anterior surface of a scleral contact lens. Platinum electrodes were attached to opposite sides of the flexible circuit and extended into holes in the scleral contact lens spaced about 14 mm apart. The ends of the ocular electrodes were recessed in the holes to enhance user comfort. When the modified scleral contact lens was applied to the eye the recesses filled with tear fluid and thereby establishing electrical contact between the electrodes and the underlying sclera. The flexible circuit and ocular electrodes were situated on the contact lens such that when the contact lens was applied to an eye, the electrodes were situated near the limbus of the eye.

The flexible circuit on the contact lens was interconnected to flexible wires that facilitated a full range of eye movement, and were connectorized for coupling to a differential probe.

Figure 7:
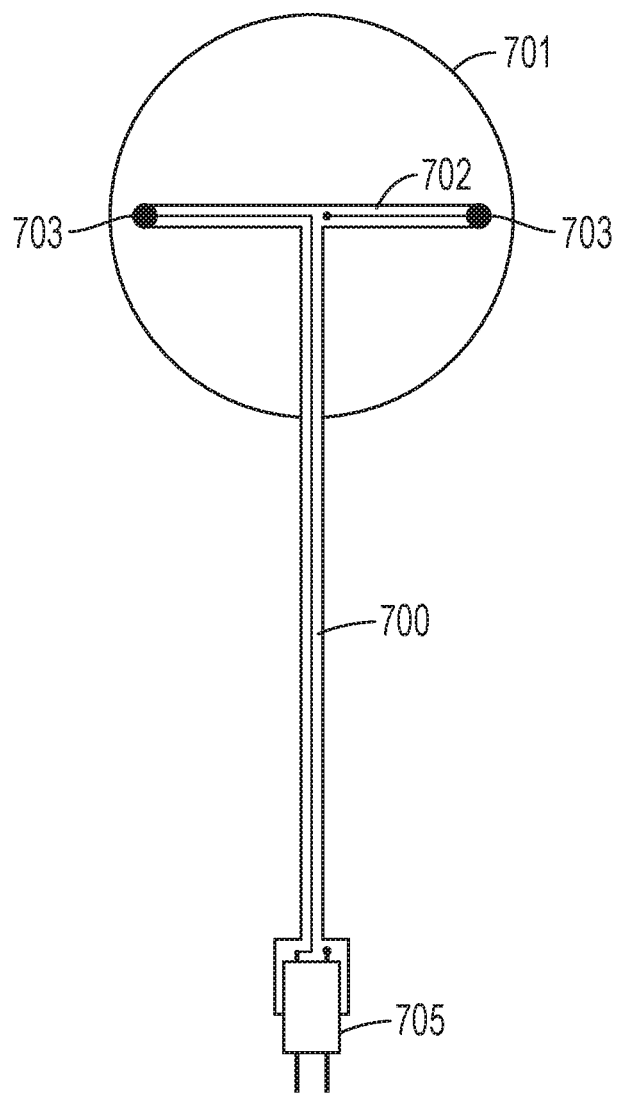
FIG. 7 shows a schematic of a test structure used to evaluate an ocular device provided by the present disclosure.
Figure 8:
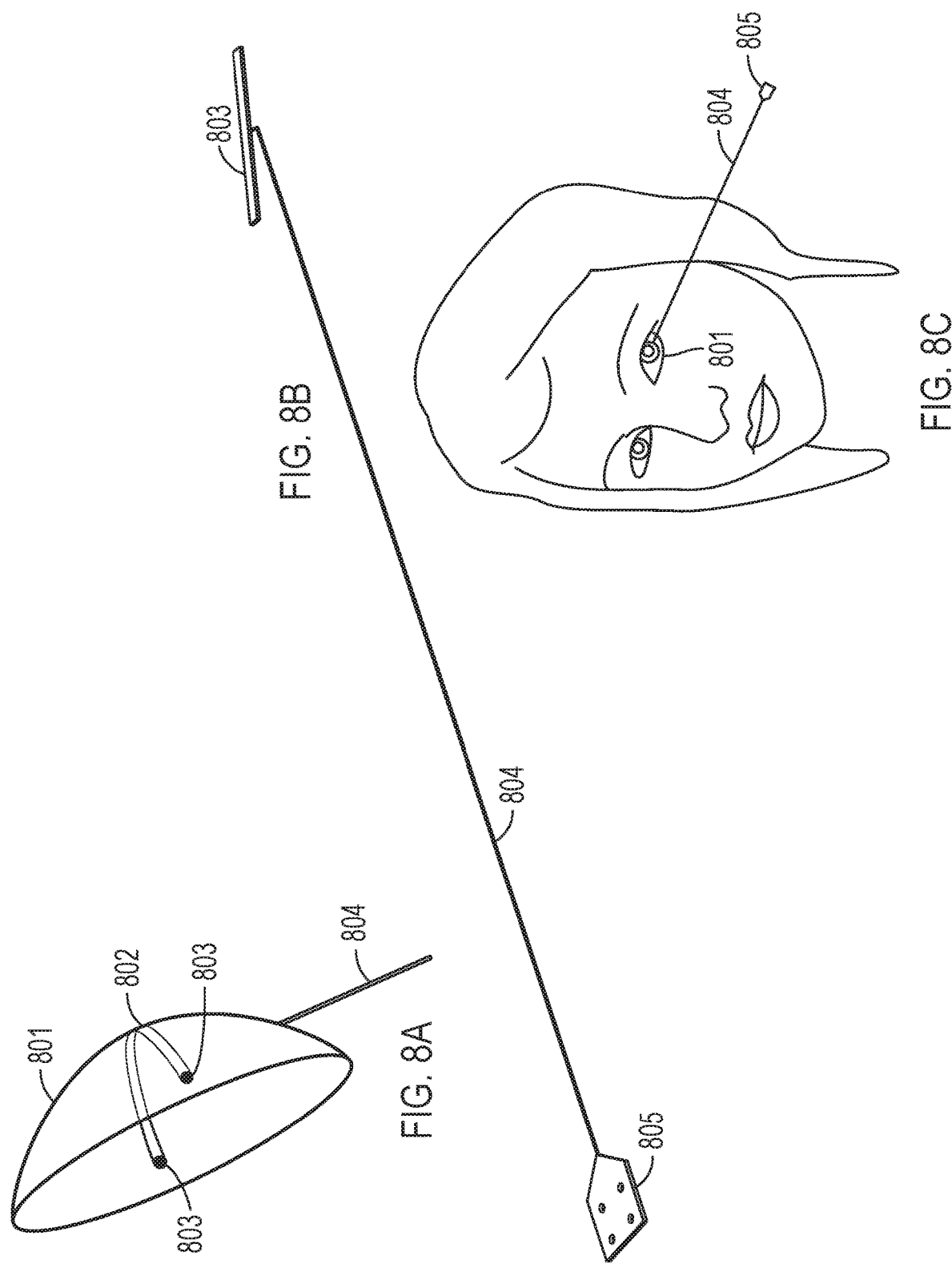
FIGS. 8A-8C show a perspective illustration of a test structure used to evaluate an ocular device provided by the present disclosure.
Figure 9:
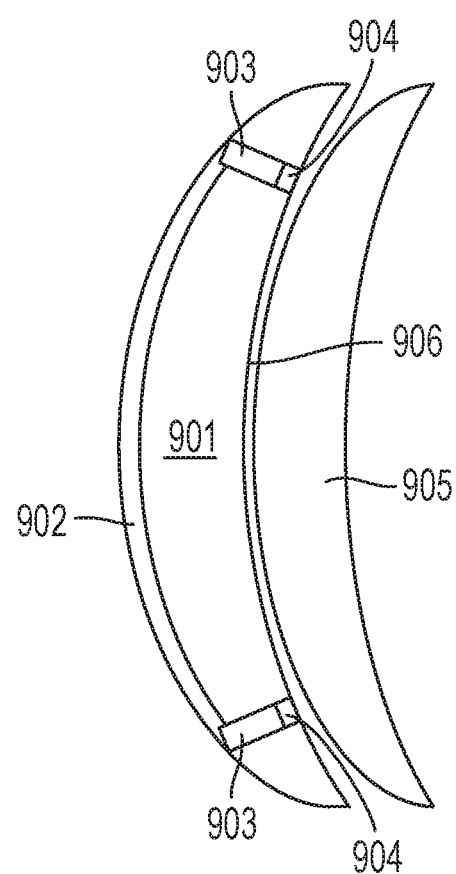
FIG. 9 shows a schematic of a cross-sectional view of a test structure used to evaluate an ocular device provided by the present disclosure.
Figure 10:
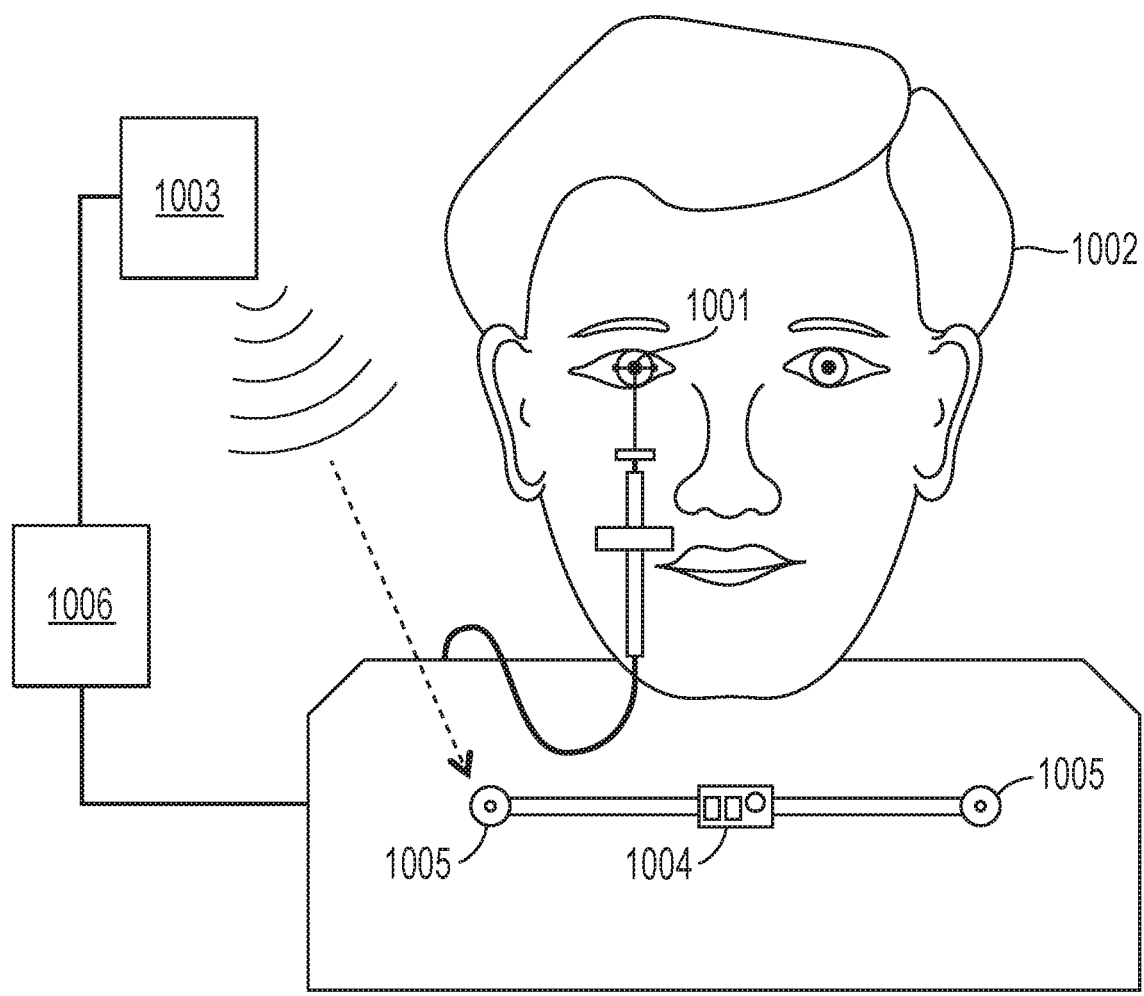
FIG. 10 shows a schematic of a test structure used to evaluate a through-body ocular communication network provided by the present disclosure.

Schematic diagrams of a scleral contact lens with ocular electrodes is shown in FIG. 7 and in FIG. 8. A cross-sectional view is shown in FIG. 9. FIG. 7 shows scleral contact lens 701, electrical interconnect 702 disposed on the anterior surface of contact lens 701, opposing ocular electrodes 703 directed toward the posterior surface of scleral lens 701, and interconnect 704 coupling on-lens interconnect 702 with electrical connector 705. FIGS. 8A-8C show views of the scleral lens 801 with on-lens interconnect 802 and ocular electrodes 803; the electrical components including the on-lens interconnect 802, off-lens interconnect 804, and connector 805; and the device when worn on a user's eye showing the off-lens interconnect 804 and connector 805. FIG. 9 shows a cross-sectional view of the scleral contact lens 901 with ocular electrodes 903 interconnected to on-lens interconnect 902. Ocular electrodes 903 are recessed within cavities 904. Scleral lens 901 is disposed adjacent cornea or sclera 905 and is separated from the cornea or sclera 905 by a thin layer of tear fluid 906, which filled recesses 904. Current flowing through cornea or sclera 905 can be sensed as a voltage drop by ocular electrodes 903, and in the example, coupled to external electronics through interconnect 902.

A body-mounted battery-powered transmitter was a shielded flex circuit with electrodes that attached to the back of the user's neck using conductive gel. The transmitter had an AC-coupled differential drive to suppress spurious coupling to interconnect 902. The transmitter was a pseudo-random bit-sequence generator with a 27 MHz clock and a 383-bit sequence length. The bit-sequence-reset line was coupled to a weak antenna that transmitted edges of the sequence-reset waveform to trigger an oscilloscope. The oscilloscope was differentially coupled to interconnect 902.

Figure 11A:
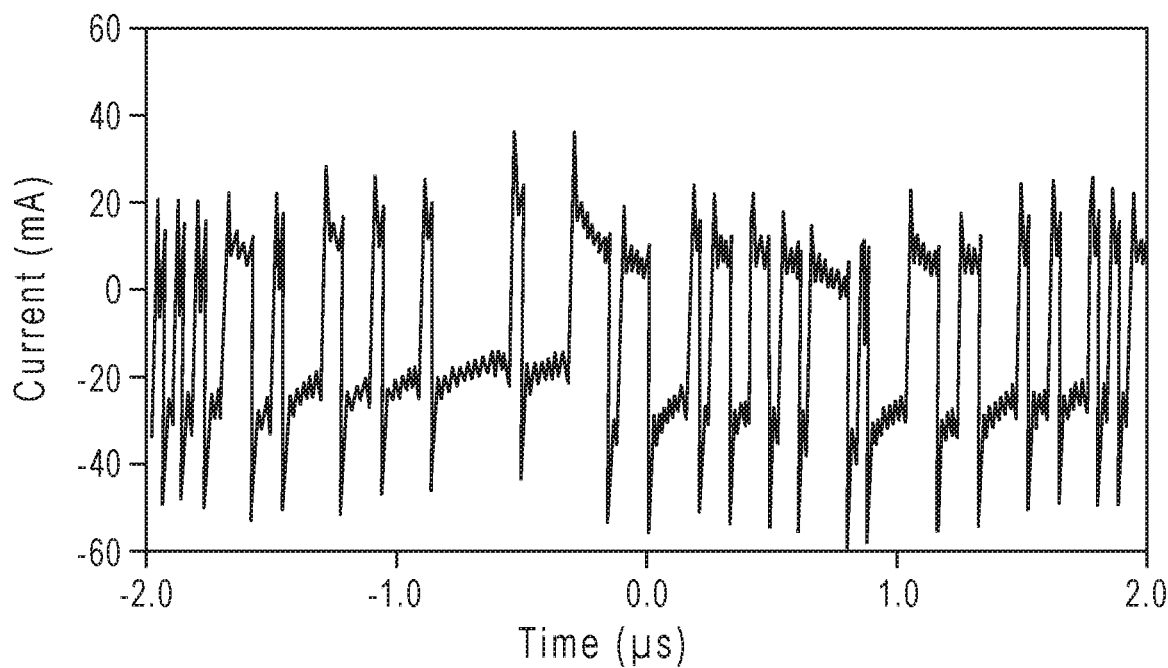
FIGS. 11A and 11B show a waveform transmitted from a frequency synthesizer to body electrodes and the waveform received by the ocular device, respectively.

The body-mounted transmitter delivered a 20.7 mA RMS signal to the on-body electrodes. The waveform of the transmitted signal is shown in FIG. 11A.

Figure 11B:
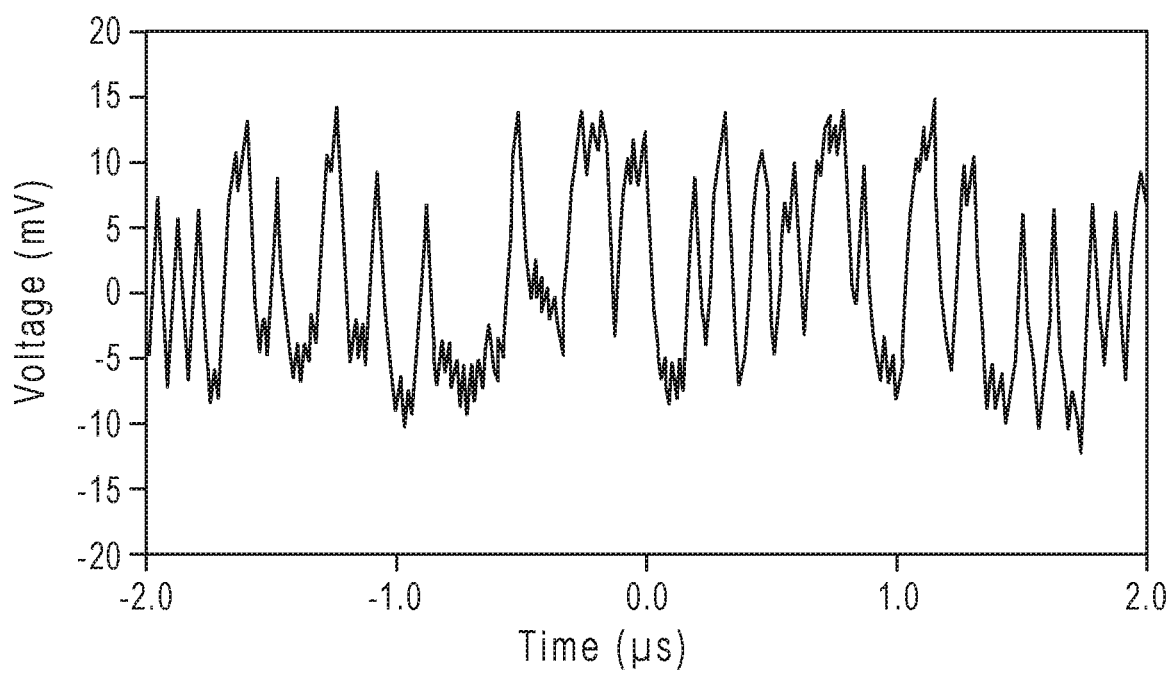

The ocular device received a 6.58 mV RMS signal. The received waveform is shown in FIG. 11B.

The results demonstrate that frequencies up to 250 MHz were accurately transmitted from an external source to an ocular device using a through-body-network.

ASPECTS OF THE INVENTION

The invention is further defined by the following aspects.

Aspect 1. An ocular device comprising: a substrate a posterior surface, and an anterior surface; an ocular communication interface incorporated into the substrate; two or more ocular electrodes, wherein, each of the ocular electrodes is electrically interconnected to the ocular communication interface; and each of the ocular electrodes is disposed proximate to the posterior surface and/or to the anterior surface of the ocular device.

Aspect 2. The ocular device of aspect 1, wherein the ocular device is configured to be worn on an eye.

Aspect 3. The ocular device of any one of aspects 1 to 2, wherein each of the ocular electrodes is configured to be capacitively coupled to the eye or to an eyelid through tear fluid when worn on the eye.

Aspect 4. The ocular device of any one of aspects 1 to 2, wherein each of the ocular electrodes is configured to be galvanically coupled to the eye or to an eyelid through tear fluid when worn on the eye.

Aspect 5. The ocular device of any one of aspects 1 to 2, wherein each of the ocular electrodes is configured to be capacitively coupled to or galvanically coupled to the tear fluid when worn on the eye.

Aspect 6. The ocular device of any one of aspects 1 to 2, wherein each of the ocular electrodes is configured to be either capacitively coupled or galvanically coupled to the eyelids through tear fluid when worn on the eye.

Aspect 7. The ocular device of any one of aspects 1 to 6, wherein the ocular communication interface comprises a receiver, a transmitter, or a combination thereof.

Aspect 8. The ocular device of any one of aspects 1 to 7, wherein two ocular electrodes comprise an ocular electrode pair.

Aspect 9. The ocular device of aspect 8, wherein the ocular electrodes of the electrode pair are disposed on opposite sides of the substrate with respect to a geometric center of the ocular device.

Aspect 10. The ocular device of any one of aspects 8 to 9, wherein each ocular electrode of the ocular electrode pair is disposed at the same radial distance with respect to the geometric center of the ocular device.

Aspect 11. The ocular device of any one of aspects 8 to 9, wherein each ocular electrode of the ocular electrode pair is disposed at a different radial distance with respect to the geometric center of the ocular device.

Aspect 12. The ocular device of any one of aspects 1 to 11, wherein the two or more ocular electrodes comprise two or more ocular electrode pairs.

Aspect 13. The ocular device of aspect 12, wherein at least one ocular electrode pair is located at a radial distance that overlies the sclera when the ocular device is worn on the eye.

Aspect 14. The ocular device of aspect 12, wherein at least one ocular electrode pair is located at a radial distance that overlies the cornea when the ocular device is worn on the eye.

Aspect 15. The ocular device of aspect 12, wherein at least one ocular electrode pair is located at a radial distance that overlies the limbus when the ocular device is worn on the eye.

Aspect 16. The ocular device of any one of aspects 12 to 15, wherein at least one ocular electrode pair is located at a radial distance that overlies the pupil when the ocular device is worn on the eye.

Aspect 17. The ocular device of any one of aspects 12 to 16, wherein at least one ocular electrode pair is configured such that when the ocular device is worn on the eye, the ocular electrodes are coaligned with the eyes of the user.

Aspect 18. The ocular device of any one of aspects 12 to 18, wherein a first ocular electrode pair is oriented orthogonal to a second ocular electrode pair.

Aspect 19. The ocular device of any one of aspects 1 to 18, wherein each of the two or more ocular electrodes comprises a biocompatible electrically conductive material.

Aspect 20. The ocular device of any one of aspects 1 to 19, wherein each of the two or more ocular electrodes comprises gold or platinum.

Aspect 21. The ocular device of any one of aspects 1 to 3 and 6 to 20, wherein each of the two or more ocular electrodes is configured to be capacitively coupled to tear fluid when worn on an eye.

Aspect 22. The ocular device of aspect 21, wherein at least one ocular electrode is embedded within the substrate and is situated in proximity to the posterior surface or in proximity to the anterior surface.

Aspect 23. The ocular device of any one of aspects 21 to 22, wherein at least one ocular electrode is within from 1 µm to 50 µm of the posterior surface.

Aspect 24. The ocular device of any one of aspects 21 to 23, wherein the capacitance between the posterior surface or the anterior surface and the at least one ocular electrode is from 1 nF to 100 pF.

Aspect 25. The ocular device of any one of aspects 21 to 24, wherein at least one ocular electrode has an area from 0.25 mm to 4 mm.

Aspect 26. The ocular device of any one of aspects 1, 2, 4, and 6 to 20, wherein at least one of the ocular electrodes is configured to be galvanically coupled to tear fluid when worn on the eye.

Aspect 27. The ocular device of aspect 24, wherein each of the ocular electrodes is configured to physically contact tear fluid when worn on the eye.

Aspect 28. The ocular device of any one of aspects 24 to 27, wherein at least one of the ocular electrodes is situated at the posterior surface.

Aspect 29. The ocular device of any one of aspects 24 to 28, wherein at least one of the ocular electrodes is situated at the anterior surface.

Aspect 30. The ocular device of any one of aspects 24 to 29, wherein, the substrate comprises at least one cavity in the posterior surface; and an ocular electrode is disposed on a wall of the cavity.

Aspect 31. The ocular device of any one of aspects 24 to 30, wherein, the substrate comprises at least one cavity in the posterior surface; and an ocular electrode is disposed within the cavity.

Aspect 32. The ocular device of any one of aspects 24 to 31, wherein, the substrate comprises at least one cavity in the anterior surface; and an ocular electrode is disposed on a wall of the cavity.

Aspect 33. The ocular device of any one of aspects 24 to 32, wherein, the substrate comprises at least one cavity in the anterior surface; and an ocular electrode is disposed within the cavity.

Aspect 34. An ocular communication system comprising: at least one ocular device of any one of aspects 1 to 33; and at least one through-body communication interface.

Aspect 35. The ocular communication system of aspect 34, further comprising a body electrode pair configured to electrically couple the through-body communication interface to the body of a user.

Aspect 36. The ocular communication system of any one of aspects 34 to 35, wherein the body communication interface comprises a receiver, a transmitter, or a combination thereof.

Aspect 37. The ocular communication system of any one of aspects 34 to 36, further comprising an accessory, wherein the accessory comprises the through-body communication interface.

Aspect 38. The ocular communication system of any one of aspects 34 to 37, further comprising an implantable device, wherein the implantable device comprises the through-body communication interface.

Aspect 39. The ocular communication system of any one of aspects 34 to 38, further comprising a wearable device, wherein the wearable device comprises the communication interface.

Aspect 40. The ocular communication system of any one of aspects 34 to 39, wherein the through-body communication interface comprises an off-body network interface.

Aspect 41. The ocular communication system of any one of aspects 34 to 40, wherein the body communication interface comprises two or more body electrodes.

Aspect 42. The ocular communication system of aspect 41, wherein the two or more body electrodes are configured to be galvanically coupled to a user's body.

Aspect 43. The ocular communication system of aspect 42, wherein the two or more body electrodes are configured to be capacitively coupled to a user's body.

Aspect 44. A through-body ocular communication network comprising at least one ocular device of any one of aspects 1 to 33 worn on the eye of a user.

Aspect 45. The network of aspect 44, wherein the network comprises a first ocular device of any one of aspects 1 to 33 worn on a first eye of the user and a second ocular device of any one of aspects 1 to 33 worn on a second eye of the user.

Aspect 46. The network of aspect 45, wherein, at least two ocular electrodes of the first ocular device; and at least two ocular electrodes of the second ocular device are coaligned with the eyes of the user.

Aspect 47. The network of any one of aspects 45 to 46, wherein, at least two ocular electrodes of the first ocular device are coaligned with the eyes of the user; and at least two ocular electrodes of the second ocular device are perpendicular to the eyes of the user.

Aspect 48. The network of any one of aspects 44 to 47, further comprising at least one through-body network interface electrically coupled to the ocular network interface of the at least one ocular device.

Aspect 49. The network of aspect 48, further comprising two or more electrodes electrically coupling the through-body network interface to the user's body.

Aspect 50. The network of aspect 49, wherein the two or more body electrodes are electrically interconnected to the user's body in proximity to the eyes.

Aspect 51. The network of aspect 50, wherein the two or more body electrodes are electrically interconnected to the user's head, forehead, jaw, cheek, neck, ear, shoulder, upper back, arm, wrist, or a combination of any of the foregoing.

Aspect 52. The network of any one of aspects 48 to 51, wherein the through-body network interface comprises a power source.

Aspect 53. The network of any one of aspects 48 to 52 wherein the through-body network interface comprises a receiver, a transmitter, or a combination thereof.

Aspect 54. The network of any one of aspects 48 to 53, wherein the through-body network interface comprises a first through-body network channel configured to communicate with the at least one ocular device; and a second through-body network channel configured to communicate with the at least one second ocular device.

Aspect 55. The network of any one of aspects 48 to 54, wherein, the at least one ocular device comprises a first ocular device worn on a first eye of the user and a second ocular device worn on a second eye of the user; and the through-body network interface comprises a first through-body network channel configured to communicate with the at least one ocular device; and a second through-body network channel configured to communicate with the at least one second ocular device.

Aspect 56. The network of any one of aspects 48 to 55, wherein the through-body network interface comprises a third channel configured to communicate with a second through-body network interface and/or with an off-body network interface.

Aspect 57. The network of any one of aspects 48 to 56, wherein the through-body network interface is incorporated into an accessory.

Aspect 58. The network of aspect 57, wherein the accessory comprises a necklace, a head band, an ear ring, a head set, an audio device, or a combination of any of the foregoing.

Aspect 59. The network of any one of aspects 48 to 58, wherein the through-body network interface comprises an implanted device, a wearable device, a handheld device, a portable device, or a combination of any of the foregoing.

Aspect 60. The network of any one of aspects 48 to 59, wherein the through-body network interface is capacitively coupled to the user's body.

Aspect 61. The network of any one of aspects 48 to 59, wherein the through-body network interface is galvanically coupled to the user's body.

Aspect 62. The network of any one of aspects 44 to 61, wherein the through-body ocular communication network is configured to operate a frequencies from 100 kHz to 5 GHz.

Aspect 63. The network of any one of aspects 44 to 62, further comprising one or more on-body network devices and/or one or more off-body devices.

Aspect 64. The network of aspect 63, wherein the one or more on-body network devices are selected from a smart phone, a wireless devices, a Bluetooth-enabled device, an audio headset, a hearing aid, a medical device, an implanted devices a medical monitoring device, and a combination of any of the foregoing.

Aspect 65. The network of aspects 63 to 64, wherein the one or more off-body network devices are selected from a portable computer, a desktop computer, or a wireless device.

Aspect 66. A method of communicating with an ocular device worn on an eye of a user, comprising: the ocular device of any one of claims 1 to 33 transmitting a signal to a through-body communication network; or the ocular device of any one of aspects 1 to 33 receiving a signal transmitted by a through-body communication network.

Aspect 67. The method of aspect 63, wherein the through-body communication network comprises the through-body ocular communication network of any one of aspects 44 to 65.

Aspect 68. A method of communicating with an ocular device worn on the eye of a user, comprising: transmitting a signal to a through-body communication network; sensing a voltage drop induced by the transmitted signal between an electrode pair of the ocular device of any one of aspects 1 to 33 worn on the eye of a user; and receiving the transmitted signal based on the sensed voltage drop by the ocular communication interface.

Aspect 69. The method of aspect 68, wherein the transmitted signal comprises a video signal.

Aspect 70. The method of aspect 69 further comprising the ocular device displaying a video image based on the video signal.

Aspect 71. The method of any one of aspects 68 to 70, wherein transmitting comprises transmitting by an on-body communication device.

Aspect 72. The method of any one of aspects 68 to 71, wherein transmitting comprises transmitting by an off-body communication device.

Aspect 73. The method of any one of aspects 68 to 72, wherein transmitting comprises transmitting by an through-body communication interface.

Aspect 74. A method of communicating with an ocular device on an eye of a user, comprising: transmitting a signal from the ocular communication interface of the optical device of any one of aspects 1 to 33 to a through-body communication network; and detecting the signal by a device interconnected to the through-body communication network.

Aspect 75 The method of claim 74, wherein transmitting comprises: generating a voltage drop between the at least two ocular electrodes; and sensing the voltage drop by a through-body communication interface interconnected to the through-body communication network.

Aspect 76. The method of any one of aspects 74 to 75, wherein the transmitted signal is proportional to the position of an eye.

Aspect 77. The method of any one of aspects 74 to 76, wherein the transmitted signal is proportional to the gaze angle of an eye.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof

What is claimed is:

1. A through-body ocular communication network comprising:
    at least one ocular device, wherein the at least one ocular device comprises:
        a substrate, a posterior surface, and an anterior surface;
        an ocular communication interface incorporated into the substrate; and
        two or more ocular electrodes,
        wherein, each of the ocular electrodes is electrically interconnected to the ocular communication interface; and
        wherein, each of the ocular electrodes is disposed proximate to the posterior surface and/or to the anterior surface of the at least one ocular device; and
    at least one through-body network interface electrically coupled to the ocular communication interface of the at least one ocular device, wherein the through-body network interface comprises:
        a first through-body network channel configured to communicate with at least one first ocular device; and
        a second through-body network channel configured to communicate with at least one second ocular device.

2. The network of claim 1, wherein each of the ocular electrodes is configured to be capacitively coupled to or galvanically coupled to an eye through tear fluid when worn on the eye.

3. The network of claim 1, wherein each of the ocular electrodes is configured to be either capacitively coupled or galvanically coupled to eyelids through tear fluid when worn on an eye.

4. The network of claim 1, wherein two ocular electrodes comprise an ocular electrode pair.

5. The network of claim 1, wherein each of the two or more ocular electrodes is configured to physically contact tear fluid when worn on the eye.

6. The network of claim 1, wherein at least one of the ocular electrodes is situated at the posterior surface.

7. The network of claim 1, further comprising a body electrode pair configured to electrically couple the through-body ocular communication interface to the body of a user.

8. The network of claim 1, wherein the through-body communication interface comprises an off-body network interface.

9. The network of claim 1, wherein the at least one ocular device comprises a first ocular device worn on a first eye of the user and a second ocular device worn on a second eye of the user.

10. The network of claim 1, further comprising two or more electrodes electrically coupling the through-body network interface to the user's body, wherein the two or more body electrodes are electrically interconnected to the user's body in proximity to the eyes.

11. The network of claim 1, further comprising one or more on-body network devices and/or one or more off-body devices.

12. A method of communicating with an ocular device worn on an eye of a user, comprising:
    the at least one ocular device transmitting a signal to the through-body ocular communication network of claim 1; or
    the at least one ocular device receiving a signal transmitted by the through-body ocular communication network of claim 1.

13. A method of communicating with an ocular device worn on the eye of a user, comprising:
    transmitting a signal to the through-body ocular communication network of claim 1;
    sensing a voltage drop induced by the transmitted signal between the electrode pair of the at least one ocular device worn on the eye of a user; and
    receiving the transmitted signal based on the sensed voltage drop by the ocular communication interface.

14. The method of claim 13, wherein transmitting comprises transmitting by an on-body communication device.

15. A method of communicating with an ocular device on an eye of a user, comprising:
    transmitting a signal from the ocular communication interface of the at least one optical device to the through-body ocular communication network of claim 1; and
    detecting the signal by a device interconnected to the through-body ocular communication network of claim 1.

16. The method of claim 15, wherein transmitting comprises:
    generating a voltage drop between the at least two ocular electrodes; and
    sensing the voltage drop by a through-body communication interface interconnected to the through-body ocular communication network.

* * * * *